United States Patent Office 3,506,618
Patented Apr. 14, 1970

3,506,618
HEXAFLUOROSILICATE ADDITIVES IN
POLYESTER PREPARATION
Mary E. Carter, Philadelphia, and John A. Price, Swarthmore, Pa., and Robert P. Mervine, Claymont, Del., assignors to FMC Corporation, Philadelphia, Pa., a corporation of Delaware
No Drawing. Filed Nov. 14, 1966, Ser. No. 593,671
Int. Cl. C08f *17/013*
U.S. Cl. 260—75               6 Claims

ABSTRACT OF THE DISCLOSURE

Process of preparing polyethylene terephthalate comprising carrying out a direct esterification reaction between terephthalic acid and ethylene glycol in the presence of a suitable hexafluorosilicate and then polycondensing the resulting product.

---

This invention relates to a method of preparing filament-forming linear polyesters. In particular it relates to a method of preparing polyethylene terephthalate resin having excellent filament-forming properties.

The manufacture of filament-forming polyester resin from a dicarboxylic acid and a diol is well known in the art. Generally, in the preparation of such polyesters, a dicarboxylic acid and glycol are first combined and subjected to a direct esterification reaction. The resulting product or prepolymer is then polycondensed at higher temperatures and under reduced pressure in the presence of a polycondensation catalyst to form the polyester resin. Various additives have been suggested heretofore for use in the first stage or esterification step of this method to enhance the reaction. However, generally, none of these have proved entirely satisfactory since many of those known, for instance, are not capable of producing suitable prepolymers for preparing linear polyester resins having sufficiently high molecular weights within a relatively short reaction period.

From a commercial standpoint, it is essential that a polyester resin be produced in the shortest possible time and that the desired degree of polymerization be obtained. A polyethylene terephthalate resin suitable for melt spinning into filaments should have a carboxyl content value of about or below 50 equivalents per million grams (eq./$10^6$ gr. or meq./kg.) and an intrinsic viscosity preferably not less than about 0.60 (as determined in a 60% phenol and 40% tetrachloroethane solution, wt./wt., at 30° C.). Additionally, it is essential that such filaments be substantially colorless, possess a high degree of tenacity and hydrolytic and thermal stability.

It is an object of this invention to prepare polyethylene terephthalate resin suitable for melt extrusion into non-degraded processable filaments by a direct esterification and polycondensation procedure.

Another object of the present invention is to provide an improved method for completing the direct esterification reaction between ethylene glycol and terephthalic acid in the preparation of polyethylene terephthalate.

These and other objects are accomplished in accordance with the present invention which involves preparing a filament-forming polyethylene terephthalate wherein terephthalic acid and ethylene glycol are directly esterified and the product of esterification is polycondensed in the presence of a polycondensation catalyst, the improvement comprising carrying out the direct esterification reaction in the presence of an additive having the formula $M_xSiF_6$, in which M represents a metal from Groups I-A, II-A, IV-A, and VII-B of the Periodic Table (see Merck Index, Sixth Edition, inside front cover) and wherein $x$ is 1 where M is a bivalent metal and $x$ is 2 where M is a monovalent metal, in an amount sufficient to improve the properties of the resulting polyester.

The metal hexafluorosilicate compounds that are used in the direct esterification step of the present invention may be suitably varied to meet requirements of reaction conditions and desired product. For example, among the first stage or esterification additives which can be used in accordance with the present method are barium hexafluorosilicate, calcium hexafluorosilicate, lead hexafluorosilicate, dilithium hexafluorosilicate, manganese hexafluorosilicate, or any combination thereof.

Generally, a catalytic quantity of the present metal hexafluorosilicate compounds in the range of from about $5 \times 10^{-6}$ to about $5 \times 10^{-2}$ mole per mole of terephthalic acid in the subject terephthalic acid-ethylene glycol reaction mixture is used in the present direct esterification method. Higher or lower concentrations of the present compounds can also be used. However, when concentrations less than the above are used, their effectiveness is generally reduced whereas if concentrations greater than this are used, no further improvement in the present method or desired product is generally obtained.

In general, the preparation of filament-forming polyesters of the present invention via the direct esterification reaction is carried out with a molar ratio of ethylene glycol to terephthalic acid from about 1:1 to about 15:1 but preferably from about 1.5:1 to about 2.5:1. The first stage direct esterification step of the present method is generally carried out at temperatures ranging from about 220° C. to about 290° C. in the absense of an oxygen containing gas at atmospheric or elevated pressure for about two to four hours. For example, the reaction may be carried out in an atmosphere of nitrogen. When the direct esterification step is completed, as indicated, for example by collection of a clear distillate, any remaining glycol is distilled off and a polycondensation catalyst is added to the esterified reaction product. The second stage or polycondensation step of the present method is generally carried out under reduced pressure within the range of from about 0.05 to 20 mm. of mercury in the absence of an oxygen containing gas at temperatures from about 260° to 325° C., for about two to six hours.

The polycondensation step of the present method is accomplished through the use of a conventional condensation catalyst for example, antimony trioxide, zinc acetyl acetonate, and the like. The polycondensation catalyst may, if indicated, be added to the present reaction mixture before initiating the first stage or direct esterification reaction between ethylene glycol and terephthalic acid or after the reaction product thereof is formed. The polycondensation catalysts are generally employed in concentrations ranging from about 0.005 to about 0.5%, based on the total weight of the reactants.

The process of this invention may be carried out either continuously or batch-wise.

The following examples of several preferred embodiments will further serve to illustrate the present invention. All parts are by weight unless otherwise indicated.

EXAMPLES

A mixture containing 84 grams (0.5 mole) of terephthalic acid, 62 grams (1.0 mole) of ethylene glycol, and $5 \times 10^{-5}$ mole of a metal hexafluorosilicate, as listed in the following table with the exact weight used in the above reaction mixture, was charged to a Fischer-Porter pressure assembly equipped with a nitrogen sparge tube and a distilling arm. The reactor was lowered into an oil bath maintained at 260° C. and flushed for ten minutes with dry nitrogen. A nitrogen pressure of 60 p.s.i. was applied and a distillate of water-ethylene glycol was collected. When a clear liquid, i.e. solution, was obtained, the pres sure was reduced to atmospheric and the remaining excess glycol was distilled. The resulting low molecular weight prepolymer was further reacted in the presence of 0.04%, based on the weight of the prepolymer, of a conventional polycondensation catalyst, e.g. antimony trioxide, under sub-atmospheric pressure of about 0.1 mm. of mercury for about four hours at 282° C. to form a high molecular weight polyester.

The following table sets forth conditions and results of various reactions carried out as described above.

TABLE

| Ex. No. | Esterification additive | Weight of metal hexafluorosilicate (gm.) | Esterification time, hrs:min | Prepolymer carboxyl content, meq./kg. | Condensation catalyst | Intrinsic viscosity | Polymer Carboxyl Content, meq./kg. |
|---|---|---|---|---|---|---|---|
| 1 | None | | 3:40 | 316 | | 0.36 | |
| 2 | Barium hexafluorosilicate | 0.0140 | 3:20 | 69 | $Sb_2O_3$ | 1.0 | 34 |
| 3 | Calcium hexafluorosilicate | 0.0091 | 2:30 | 150 | $Sb_2O_3$ | 0.93 | 42 |
| 4 | Lead hexafluorosilicate | 0.0175 | 2:45 | 125 | $Sb_2O_3$ | 0.85 | 48 |
| 5 | Dilithium hexafluorosilicate | 0.0096 | 3:25 | 33 | $Sb_2O_3$ | 0.60 | 34 |
| 6 | Manganese hexafluorosilicate | 0.0155 | 2:50 | 66 | [1] $Sb_2O_3$ | 0.97 | 32 |

[1] 3 hour polycondensation time.

The intrinsic viscosity of the polyester resin products of the above examples were measured in a 60% phenol and 40% tetrachloroethane solution (wt./wt.) at 30° C.

The results shown in the above table indicate that the presence of a metal hexafluorosilicate during the direct esterification step in the production of filament-forming polyester resin, in general, facilitates the preparation of and improves the prepolymer formed and in turn the polyester resin product. Through the use of such an additive, the direct esterification reaction time is greatly reduced and the resulting prepolymer is, in general, characterized as being a more highly esterified product than one produced when no esterification additive is used as indicated by the carboxyl content of the prepolymers. Further, the prepolymers of the present method can be condensed to yield polyester resins which have high molecular weights as indicated by their intrinsic viscosity.

The process of the present invention has been described with particular reference to polyethylene terephthalate; however, it will be obvious that the subject invention includes within its scope other polymeric polymethylene terephthalates formed from glycols of the series $$HO(CH_2)_nOH$$

where $n$ is 2 to 10 and terephthalic acid and copolyesters containing varied amounts of other suitable dicarboxylic acids such as isophthalic acid.

We claim:
1. In a method for preparing filament-forming polyethylene terephthalate resin wherein terephthalic acid and ethylene glycol are directly esterified and the product of esterification is polycondensed in the presence of a polycondensation catalyst, the improvement comprising carrying out the direct esterification reaction in the presence of a catalytic quantity of a direct esterification catalytic additive having the formula $M_xSiF_6$, in which M represents a metal from Groups I-A, II-A, or IV-A of the Periodic Table (Merck Index, Sixth Edition), and wherein $x$ is 1 where M is a bivalent metal and $x$ is 2 where M is a monovalent metal.

2. The method of claim 1 wherein the additive is present in an amount ranging from about $5 \times 10^{-6}$ to about $5 \times 10^{-2}$ mole per mole of terephthalic acid.

3. The method of claim 1 wherein the additive is barium hexafluorosilicate.

4. The method of claim 1 wherein the additive is calcium hexafluorosilicate.

5. The method of claim 1 wherein the additive is lead hexafluorosilicate.

6. The method of claim 1 wherein the additive is dilithium hexafluorosilicate.

References Cited

UNITED STATES PATENTS

| 3,228,913 | 1/1966 | Nesty et al. |
| 3,329,651 | 7/1967 | Dobinson. |
| 3,346,542 | 10/1967 | Koepp et al. |
| 3,356,641 | 12/1967 | Roedel et al. |
| 3,395,127 | 7/1968 | Dobinson _____ 260—75 |

FOREIGN PATENTS 1,385,050  11/1964  France.

WILLIAM H. SHORT, Primary Examiner

L. P. QUAST, Assistant Examiner

U.S. Cl. X.R.

260—475